US007198860B2

(12) United States Patent
Vance

(10) Patent No.: US 7,198,860 B2
(45) Date of Patent: Apr. 3, 2007

(54) CERAMIC TILE INSULATION FOR GAS TURBINE COMPONENT

(75) Inventor: Steven James Vance, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 343 days.

(21) Appl. No.: 10/423,528

(22) Filed: Apr. 25, 2003

(65) Prior Publication Data

US 2006/0216547 A1 Sep. 28, 2006

(51) Int. Cl.
*B32B 18/00* (2006.01)

(52) U.S. Cl. ...................... 428/701; 428/697; 428/698; 428/699; 428/632; 428/702; 416/186 R; 416/224; 416/97 A; 416/229 A

(58) Field of Classification Search ................ 428/697, 428/698, 699, 701, 702, 632; 60/753, 754; 244/123, 132; 415/200, 121, 197, 173.4, 415/174.4; 416/186 R, 224, 229 A, 97 A
See application file for complete search history.

(56) References Cited

U.S. PATENT DOCUMENTS

| | | | | |
|---|---|---|---|---|
| 4,124,732 | A * | 11/1978 | Leger | 428/77 |
| 4,308,309 | A * | 12/1981 | Frosch et al. | 428/193 |
| 4,928,575 | A | 5/1990 | Smirlock et al. | |
| 5,170,690 | A | 12/1992 | Smirlock et al. | |
| 5,191,166 | A * | 3/1993 | Smirlock et al. | 89/36.02 |
| 5,331,816 | A * | 7/1994 | Able et al. | 60/753 |
| 5,404,793 | A | 4/1995 | Myers | |
| 5,636,508 | A | 6/1997 | Shaffer et al. | |
| 5,639,531 | A * | 6/1997 | Chen et al. | 428/49 |
| 5,972,819 | A | 10/1999 | Cohen | |
| 6,174,565 | B1 | 1/2001 | Daws et al. | |
| 6,197,424 | B1 | 3/2001 | Morrison et al. | |
| 6,287,511 | B1 | 9/2001 | Merrill et al. | |
| 6,322,322 | B1 * | 11/2001 | Rhodes et al. | 415/191 |
| 6,332,390 | B1 | 12/2001 | Lyons | |
| 6,365,281 | B1 | 4/2002 | Subramanian et al. | |
| 2002/0178900 | A1 * | 12/2002 | Ghiorse et al. | 89/36.02 |

OTHER PUBLICATIONS

LAST® Armor description page. LAST® Armor is a registered trademark of LAST® Armor, Inc. Subsidiary of Foster-Miller, Inc, Waltham, MA, 1995.

* cited by examiner

*Primary Examiner*—Jennifer C. McNeil
*Assistant Examiner*—Aaron Austin

(57) ABSTRACT

Ceramic tile (32) insulation for protecting a substrate material (34) in a high temperature environment. A plurality of ceramic tiles (78) may be used in combination with a monolithic layer of ceramic insulation (80) to protect a fillet region (76) and an airfoil section (80), respectively, of a gas turbine vane (72). Individual ceramic tiles (84) may be applied to repair a damaged area of the monolithic insulating layer. Ceramic tile insulation may be applied in two layers (56, 58) with the material properties of the two layers being different, and with the gaps (38) of the two layers being misaligned.

21 Claims, 3 Drawing Sheets

CERAMIC TILE INSULATION FOR GAS TURBINE COMPONENT

FIELD OF THE INVENTION

This invention relates generally to the field of power generation, and more particularly to the hot gas path components of a combustion turbine engine, and specifically to ceramic insulating tiles applied over portions of a gas turbine component.

BACKGROUND OF THE INVENTION

It is known to apply a ceramic insulating material over the surface of a component that is exposed to gas temperatures that exceed the safe operating temperature range of the component substrate material. Metallic combustion turbine (gas turbine) engine parts (e.g. nickel, cobalt, iron-based alloys) are routinely coated with a ceramic thermal barrier coating (TBC), for example as described in U.S. Pat. No. 6,365,281 issued to the present inventor, et al., and assigned to the present assignee. Such coatings are generally deposited by a vapor deposition or thermal spray process.

The firing temperatures developed in combustion turbine engines continue to be increased in order to improve the efficiency of the machines. Ceramic matrix composite (CMC) materials are now being considered for applications where the temperature may exceed the safe operating range for metal components. U.S. Pat. No. 6,197,424, assigned to the present assignee, describes a gas turbine component fabricated from CMC material and covered by a layer of a dimensionally stable, abradable, ceramic insulating material, commonly referred to as friable grade insulation (FGI). Hybrid FGI/CMC components offer great potential for use in the high temperature environment of a gas turbine engine, however, the full value of such hybrid components has not yet been realized due to their relatively recent introduction to the gas turbine industry.

SUMMARY OF THE INVENTION

Improved thermal insulation systems are needed for combustion turbine components, and improved hybrid FGI/CMC components for high temperature environments are desired.

An apparatus for use in a high temperature environment is described herein as including: a substrate comprising ceramic matrix composite material; a monolithic layer of ceramic insulating material disposed on a first portion of the substrate; and a plurality of individual tiles of ceramic insulating material disposed on a second portion of the substrate. The second portion of the substrate may be an area previously covered by the monolithic layer of ceramic insulating material and wherein a damaged portion of the monolithic ceramic insulating material has been removed and replaced with the plurality of individual tiles of ceramic insulating material. The plurality of individual tiles of ceramic insulating material may include a first layer of tiles disposed directly on the substrate and a second layer of tiles disposed on the first layer of tiles, wherein the first layer of tiles may be a material different than a material of the second layer of tiles. The pattern of gaps between adjacent tiles of the first layer of ceramic insulating tiles may be staggered in relation to a pattern of gaps between adjacent tiles of the second layer of ceramic insulating tiles.

A vane for a combustion turbine engine is described herein as including: an airfoil section; a platform section; a fillet along a joint between the airfoil section and the platform section; and a plurality of individual tiles of ceramic insulating material bonded to the fillet.

An apparatus for use in a high temperature environment is described herein as including: a substrate; a monolithic layer of ceramic insulating material disposed over a surface of the substrate; and a repaired region wherein a portion of the monolithic layer of ceramic insulating material has been removed and an individual tile of ceramic insulating material has been bonded. The entire thickness of the monolithic layer of ceramic insulating material may be removed in the repaired region with the individual tile being bonded to the substrate, or a partial thickness of the monolithic layer of ceramic insulating material may be removed in the repaired region to bond the individual tile to a remaining thickness of the monolithic layer of ceramic insulating material.

A component for use in a combustion gas stream environment is described herein as including: a ceramic matrix composite substrate material; and a layer of individual tiles of ceramic insulating material bonded to a portion of a surface of the substrate to isolate that portion of the substrate surface from the combustion gas stream.

BRIEF DESCRIPTION OF THE DRAWINGS

These and other advantages of the invention will be more apparent from the following description in view of the drawings that show.

DETAILED DESCRIPTION OF THE INVENTION

Figure 1:
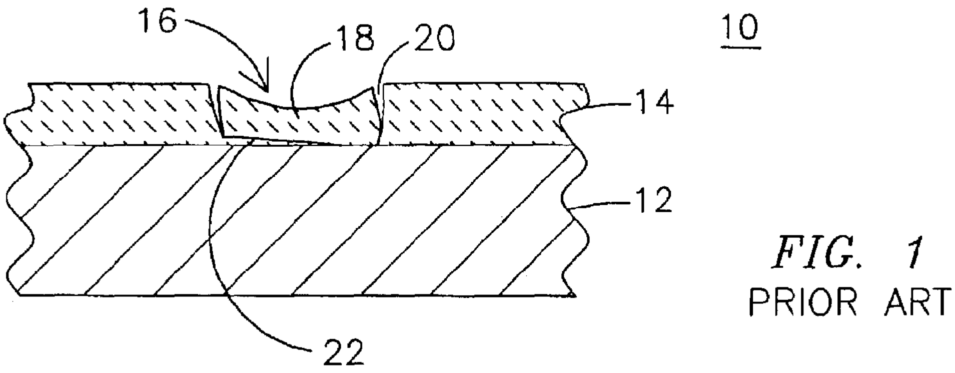
FIG. 1 PRIOR ART
FIG. 1 is a partial cross-sectional view of a component of a gas turbine engine utilizing a prior art thermal insulation system showing debris impact damage.

Components of a gas turbine engine are exposed to a corrosive, high temperature environment, and they must be able to withstand the erosion and impact effects of a high velocity combustion gas stream. A prior art gas turbine component 10 is shown in partial cross-section in FIG. 1. The component 10 includes a substrate material 12 protected by an overlying layer of ceramic insulating material 14. The substrate material 12 may be, for example, a cobalt or nickel based superalloy or a ceramic matrix composite (CMC) material. A bonding material may be deposited between the substrate 12 and the insulating material 14 to improve the adhesion there between. The bonding material may be a layer of MCrAlY alloy (not shown), where M may be Fe, Co, Ni or mixtures thereof for metal substrates, and it may be a ceramic adhesive for CMC substrates.

The insulating layer 14 may be exposed to impact by high-energy particles propelled by the combustion gas stream. An impact crater 16 is visible in the insulating layer 14. The major damage mechanisms that result from such surface impacts are a crush zone 18 directly under the site of the impact, thru-thickness cracking 20 caused by in-plane tensile stress in the area immediately surrounding the crush zone 18, and delamination 22 of the insulating material 14 from the substrate 12 caused by rebound stresses across the interface. The extent of such damage will depend not only upon the energy and size of the impacting particle, but also will depend upon the particular material composition and mechanical properties of the insulating material 14. Material properties of the insulating material 14 are often a compromise among conflicting parameters, and materials that are optimized for resisting erosion may be relatively brittle and more susceptible to impact damage.

Figure 2:
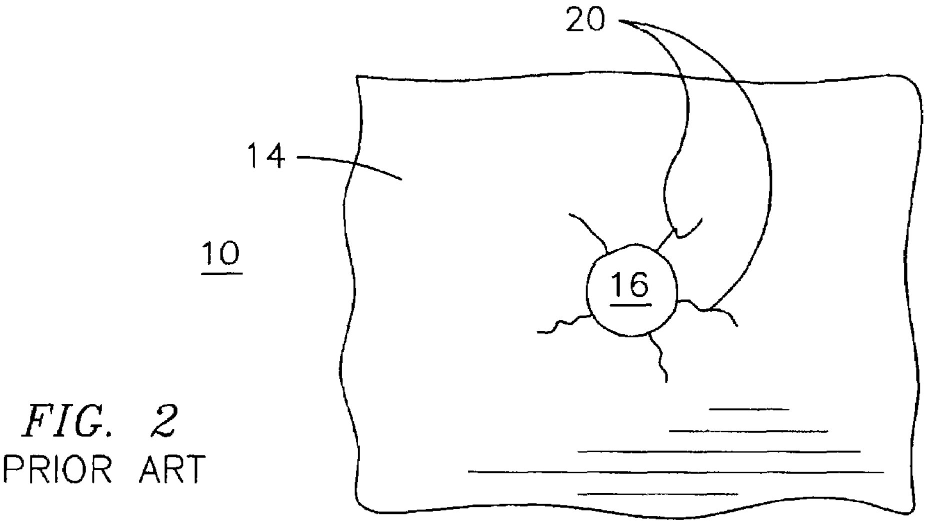
FIG. 2 PRIOR ART
FIG. 2 is a partial plan view of the prior art component of FIG. 1.

FIG. 2 is a plan view of the component of FIG. 1 showing the lateral extent of the cracking 20 that may be caused by impact damage. Prior art ceramic insulating material 14 is deposited as a monolith, i.e. as a large single layer of material covering an entire surface of the substrate that is exposed during the deposition or bonding process. Such a monolith may be susceptible to the progression of cracking 20 and/or delamination 22 due to the stress concentration existing at the crack tip, thereby resulting in degradation of the insulating layer 14 over an area significantly larger than the area of the actual impact crater 16.

Figure 3:
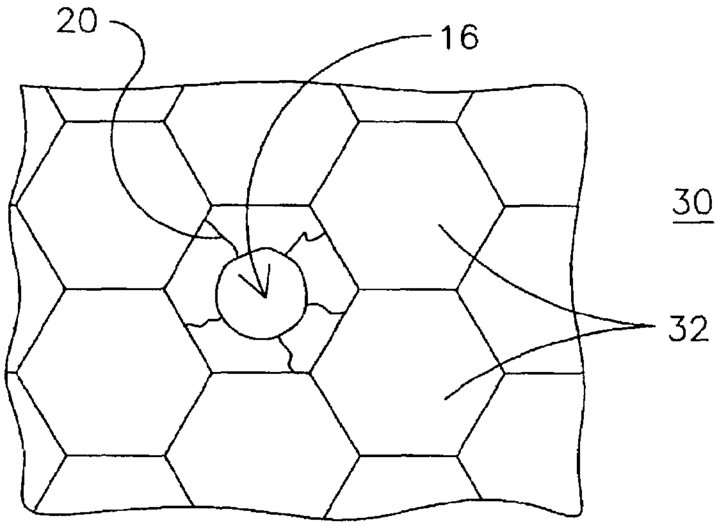
FIG. 3 is a partial plan view of a component of a gas turbine engine utilizing a plurality of individual ceramic insulating tiles.
Figure 4:
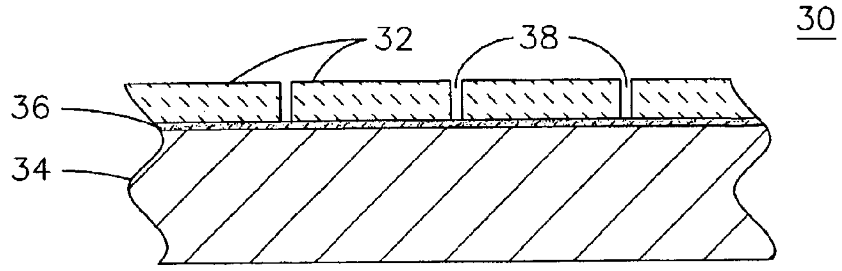
FIG. 4 is a partial cross-sectional view of the component of FIG. 3

An improved component 30 for a gas turbine engine or other high temperature application is illustrated in plan view in FIG. 3 and in partial cross-section in FIG. 4. Component 30 includes a plurality of individual tiles 32 of ceramic insulating material. Each tile 32 is bonded to the surface of a substrate 34 by a high temperature ceramic-based adhesive 36. The adhesive may be in the form of a ceramic slurry, frit slurry, sol-gel, reaction bonding adhesive, or self-propagating high temperature reaction adhesive. An oxide-based paste adhesive 36 may be reinforced with chopped ceramic fibers, ceramic platelets or equiaxed ceramic particles to customize its important properties, such as strength, elastic modulus, conductivity and coefficient of thermal expansion. The selection of adhesives useful in bonding individual tiles may be greater than the selection available for bonding large monolithic shapes due to the smaller contiguous area that must be bonded. Shrinkage typically occurs in an adhesive layer during a bonding process. The bonding of a large non-flat monolithic structure will result in three-dimensional shrinkage-induced strain that may lead to high residual stresses and premature failure of the bond. Small, flat or nearly flat tiles can be applied with less sensitivity to shrinkage. Small tiles are constrained in the plane parallel to the bond line, but they are unrestrained in the perpendicular direction. Consequently, the residual stresses caused by shrinkage are minimized.

Substrate 34 may be any appropriate structural material, for example an alloy material or composite material such as an oxide/oxide CMC material. Tiles 32 may be any appropriate insulating material, for example a friable grade insulation (FGI) as described in the above-cited '424 patent. Because the individual tiles 32 are separated from each other by gaps 38, any damage or cracking 20 associated with an impact crater 16 will not progress to any adjacent tile that is not actually struck by the impacting object. Because the gaps 38 function as a crack-tip limiter, the specific chemical and mechanical properties of the ceramic material used to form the tiles 32 may be optimized for erosion and/or another selected property with less concern needed for properties that affect impact damage containment. For example, the tiles 32 may be selected to be a ceramic insulating material that has purposefully increased strength and hardness when compared to alternatives, while the corresponding increase in brittleness and decreased impact resistance is of reduced concern since crack propagation and delamination are limited to individual tiles 32.

Figure 5:
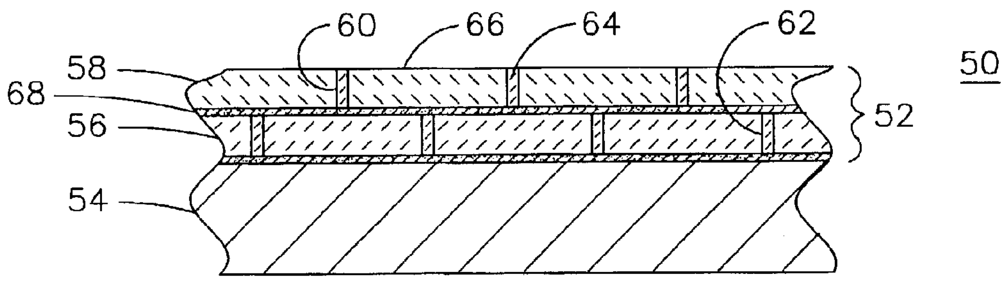
FIG. 5 is a partial cross-sectional view of a further embodiment of a component of a gas turbine engine utilizing a two-layer coating of individual ceramic insulating tiles.
Figure 6:
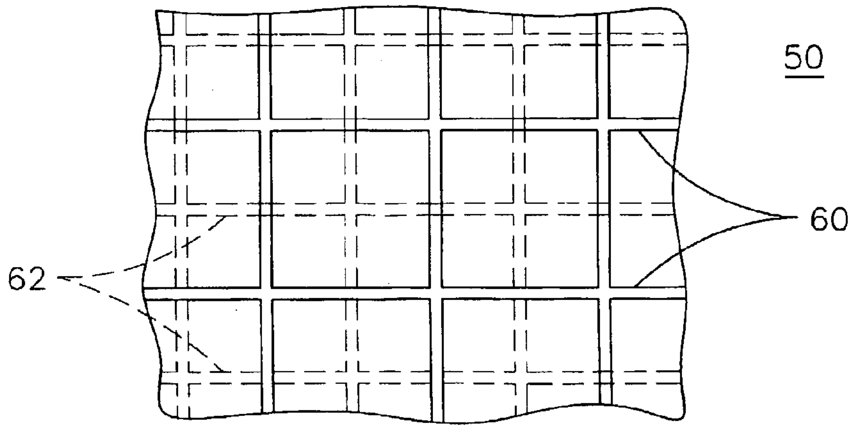
FIG. 6 is a partial plan view of the component of FIG. 5.

FIGS. 5 and 6 illustrate a further embodiment of a gas turbine engine component 50 having an insulating layer 52 disposed over a substrate 54. In this embodiment, the insulating layer 52 includes a first layer of ceramic insulating tiles 56 bonded to a surface of the substrate 54 and a second layer of ceramic insulating tiles 58 bonded to the first layer of tiles 56. An adhesive may be used to bond the individual tiles as in the single layer embodiment of FIG. 4. In the present invention the insulating layer 52 may be thicker than prior art insulating layers, and may be in the range of 2–10 mm for curved surface applications such as airfoils and even thicker for flat applications, such as to a thickness of 50 mm. In one embodiment, two layers of 2 mm thick tiles are used to achieve an insulating layer thickness of 4 mm on a combustion turbine vane airfoil. The pattern of gaps 60 between adjacent tiles of the second layer of ceramic insulating tiles 58 may be staggered in relation to the pattern of gaps 62 between adjacent tiles of the first layer of ceramic insulating tiles 56 (shown in phantom in FIG. 6) in order to minimize the extent of thru-thickness gaps.

The material selected for the first layer of tiles 56 may be different than that selected for the second layer of tiles 58. For example, the first layer 56 may be formed from a ceramic insulating material that optimizes its thermal insulating characteristics, while the second layer 58 may be formed from a ceramic insulating material that optimizes its erosion resistance properties. An inner layer 56 may be formed with aluminum phosphate, aluminosilicate or other low modulus matrix material that is compatible with the substrate 54 but that is somewhat prone to erosion and environmental attack, such as from water vapor in a combustion gas. An outer layer 58 that is more erosion resistant, e.g. alumina, stabilized zirconia, stabilized hafnia, but is more prone to impact damage would benefit from having the inner tile layer 56 act as a compliant layer. Additional layers of insulating tiles may be used, or a single layer of insulating tiles may be placed over a monolithic layer of insulating material deposited directly onto the substrate. A layer of tiles may be used over a monolithic layer of ceramic insulating material in order to provide thermal shock and/or impact resistance on an outer surface over an environmentally resistant under layer.

A filler material or grout 64 may be deposited in the gaps 60, 62 of either or both layers 56, 58. Grout 64 functions as a barrier to the direct passage of the hot combustion gas and it smoothes the airflow across the top surface 66 of the component 50. Grout 64 may be selected to have mechanical properties that are different than those of the tiles of layers 56, 58. For example, grout 64 may be a ceramic insulating material having a low elastic modulus and a high damage tolerance, i.e. likely to micro crack instead of macro crack, such as mullite or submicron blends of multiple phase-stable ceramics such as alumina-zirconia, alumina-hafnia, alumina ceria.

The insulating tiles 32, 56, 58 of the present invention may be manufactured by net shape casting or by machining from a larger slab of ceramic material. Individual tiles may have a rectangular or square or other shape along their exposed surface and they may be shaped to fit complex substrate surface shapes. A typical tile may be square with sides of 6–50 mm. In one embodiment, a tile is 25 mm by 25 mm by 2 mm in thickness. The tiles may be bonded individually to the substrate 12, 34, 54 or to an underlying layer of tiles 56 by applying adhesive 36 to the back of the tile, to the surface of the substrate, or to both. The individual tiles are then pressed onto the surface of the substrate and a permanent bond is achieved by drying and firing at an elevated temperature, typically 1,000–1,200° C. The tiles can be bonded to the substrate after they have been partially or fully fired to selectively reduce the amount of shrinkage that is experienced by the tiles once they are affixed onto the substrate. Multiple tiles may be attached to a supportive, flexible scrim such as a woven ceramic cloth 68. An entire sheet containing multiple tiles may thus be applied with adhesive as described above to expedite the application process.

Figure 7:
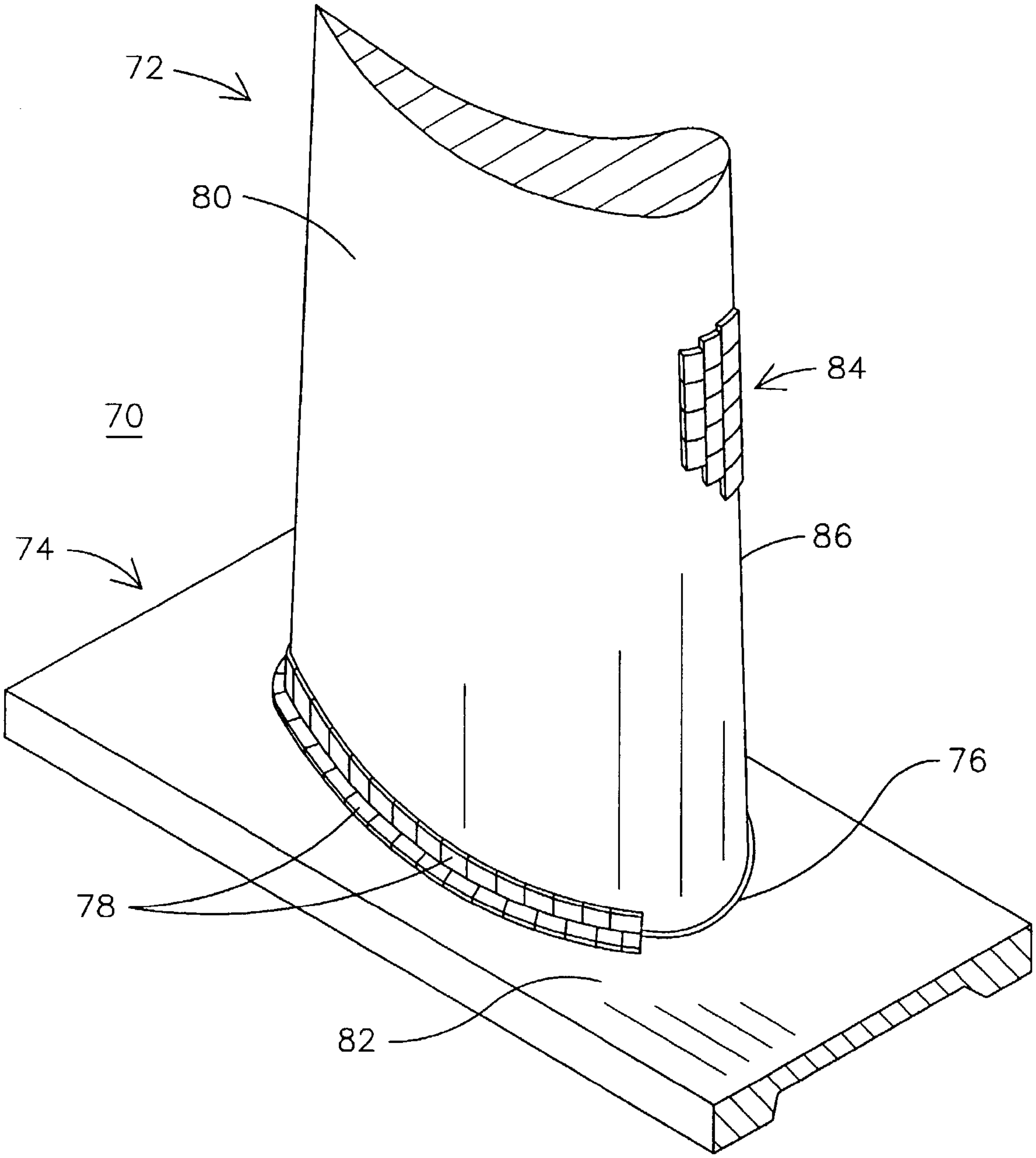
FIG. 7 is a plan view of a gas turbine vane utilizing both monolithic ceramic insulation and a plurality of individual ceramic insulating tiles in selected areas.

FIG. 7 illustrates a combustion turbine stationary vane 70 having an airfoil section 72 and a platform section 74. As is known in the art, a fillet radius 76 is used to reduce stress concentrations at the joint between the two surfaces. This fillet radius 76 may be formed by integral casting, machining, or joining process such as welding. The fillet 76 extends along a joint between the airfoil section 72 and the platform section 74. Although the fillet is sized to help reduce the stress in the joint, the fillet is typically a highly stressed component, and it is a difficult region to cool due to its complex geometry. Furthermore, it is difficult to apply a monolithic ceramic insulating layer to the fillet 76 due to the geometry. A plurality of individual tiles 78 of ceramic insulating material is bonded to the fillet 76 to provide a desired degree of thermal insulation. The tiles 78 may extend to be bonded to areas of the airfoil section 72 and/or platform section 74 proximate the fillet 76. Respective monolithic shapes 80, 82 of ceramic insulating material cover other areas of the airfoil section 72 and platform section 74. The monolithic shapes 80, 82 may be applied to the respective surfaces prior to joining the airfoil section 72 and platform section 74 together. These surfaces are relatively flat and present fewer difficulties when depositing an insulating coating with prior art deposition techniques. After the sections 72, 74 are joined and fillet 76 is formed, the individual tiles 78 of ceramic insulating material are bonded over the fillet 76, with the number and shape of the tiles 78 being selected to mate with the extent of the coverage of the monolithic coatings 80, 82.

Additional ceramic insulating tiles 84 are shown as applied to a portion of a leading edge 86 of the airfoil section 72. These tiles 84 have been installed in an area of the vane 70 that was previously damaged, such as during a manufacturing operation or during in-service use in a combustion turbine engine. A damaged area of the monolithic insulating material 80 has been removed either to a portion of the depth of the monolithic material or completely to the surface of the underlying material which may be a ceramic matrix composite structural ceramic material. At least one tile 84 has been installed in place of the damaged material, with the tile 84 being bonded to the substrate material or to the remaining thickness of the monolithic insulating material. The damaged material may be removed from the surface of the airfoil section 72 by a mechanical operation such as grinding. Additional processes such as milling, grit blasting using dry ice, alumina, silica, quartz, ice, etc. may be used to prepare the surface for bonding. The tiles 84 are then applied with an adhesive and a grout may be applied to fill in any gaps adjacent to the tiles 84. The part is then heated to fully cure the adhesive and grout, as necessary, and the vane 70 is returned to service.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim:

1. An apparatus for use in a high temperature environment, the apparatus comprising:
- a substrate comprising ceramic matrix composite material;
- a monolithic layer of ceramic insulating material disposed on a first portion of the substrate; and
- a plurality of individual tiles of ceramic insulating material, each tile comprising a top surface for exposure to the high temperature environment and an opposed bottom surface bonded to a second portion of the substrate.

2. The apparatus of claim 1, wherein the second portion of the substrate comprises an area proximate an intersection of two surfaces.

3. The apparatus of claim 1, wherein the second portion of the substrate comprises an area previously covered by the monolithic layer of ceramic insulating material and wherein a damaged portion of the monolithic ceramic insulating material has been removed and replaced with the plurality of individual tiles of ceramic insulating material.

4. The apparatus of claim 1, wherein the second portion of the substrate comprises a fillet between an airfoil section and a platform section of a combustion turbine component.

5. The apparatus of claim 1, further comprising a grout material disposed between adjacent individual tiles.

6. The apparatus of claim 1, further comprising a ceramic material disposed as a grout between respective adjacent individual tiles of ceramic insulating material, wherein the ceramic grout material is selected to exhibit a lower elastic modulus than that exhibited by the tiles.

7. The apparatus of claim 6, wherein the tiles are selectively fired before being bonded to the substrate to control an amount of shrinkage experienced by the tiles once they are affixed to the substrate.

8. The apparatus of claim 1, wherein the plurality of individual tiles of ceramic insulating material comprises a first layer of tiles disposed directly on the substrate and a second layer of tiles disposed on the first layer of tiles.

9. The apparatus of claim 8, wherein the first layer of tiles comprises a material different than a material of the second layer of tiles.

10. The apparatus of claim 8, wherein gaps between adjacent tiles of the first layer are misaligned with gaps between adjacent tiles of the second layer.

11. An apparatus for use in a high temperature environment comprising:
- a substrate;
- a first layer of ceramic insulating tiles bonded to a surface of the substrate, and
- a second layer of ceramic insulating tiles bonded to the first layer of ceramic insulating tiles;
- wherein tiles of at least one of the first layer and the second layer are selectively fired before being bonded to control an amount of shrinkage experienced by the tiles after they are bonded to underlying material.

12. A vane for a combustion turbine engine comprising:
- an airfoil section;
- a platform section;
- a fillet along a joint between the airfoil section and the platform section; and a plurality of individual tiles of ceramic insulating material bonded to the fillet.

13. The vane of claim 12, further comprising a monolithic ceramic insulating material bonded to one of the airfoil section and the platform section.

14. The vane of claim 12, further comprising a ceramic grout material disposed between adjacent ones of the plurality of tiles.

15. The vane of claim 12, wherein the tiles are selectively fired before being bonded to the fillet to control an amount of shrinkage experienced by the tiles once they are affixed to the fillet.

16. An apparatus for use in a high temperature environment, the apparatus comprising:

a substrate;

a monolithic layer of ceramic insulating material disposed over a surface of the substrate; and a repaired region wherein a portion of the monolithic layer of ceramic insulating material has been removed and an individual tile of ceramic insulating material has been bonded across an entire bottom surface of the tile.

17. The apparatus of claim 16, wherein an entire thickness of the monolithic layer of ceramic insulating material has been removed in the repaired region and the individual tile is bonded to the substrate.

18. The apparatus of claim 16, wherein a partial thickness of the monolithic layer of ceramic insulating material has been removed in the repaired region and the individual tile is bonded to a remaining thickness of the monolithic layer of ceramic insulating material.

19. The apparatus of claim 16, wherein the tile is selectively fired before being bonded to control an amount of shrinkage experienced by the tile once it is affixed to the underlying material.

20. The apparatus of claim 16, wherein the bottom surface of the tile is bonded with a ceramic-based adhesive.

21. A component for use in a combustion gas stream environment, the component comprising:

a ceramic matrix composite substrate material; and a layer of individual tiles of ceramic insulating material, each tile comprising a top surface and an opposed bottom surface individually bonded to a portion of a surface of the substrate to isolate that portion of the substrate surface from the combustion gas stream, wherein the individual tiles have been selectively fired prior to being bonded to the substrate to control an amount of shrinkage of the tiles after they are bonded to the substrate.

* * * * *